US006823348B2

(12) United States Patent
Benayoun et al.

(10) Patent No.: US 6,823,348 B2
(45) Date of Patent: *Nov. 23, 2004

(54) FILE MANAGER FOR STORING SEVERAL VERSIONS OF A FILE

(75) Inventors: Alain Benayoun, Cagnes-sur-mer (FR); Jacques Fieschi, St-Laurent-du-Var (FR); Jean-François Le Pennec, Nice (FR); Patrick Michel, La Gaude (FR)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,242

(22) Filed: Jan. 28, 2000

(65) Prior Publication Data

US 2003/0074376 A1 Apr. 17, 2003

(30) Foreign Application Priority Data

Jan. 29, 1999 (EP) .............................................. 99480001

(51) Int. Cl.[7] .............................................. G06F 17/30
(52) U.S. Cl. ........................ 707/203; 707/205; 707/206
(58) Field of Search ................................. 707/200, 201, 707/202, 203, 204, 205, 100–103, 1–4

(56) References Cited

U.S. PATENT DOCUMENTS

| 4,961,224 | A | * | 10/1990 | Yung | |
| 5,440,737 | A | * | 8/1995 | Uchinuma | 707/205 |
| 5,590,320 | A | * | 12/1996 | Maxey | 707/203 |
| 5,649,196 | A | * | 7/1997 | Woodhill et al. | 707/204 |
| 5,835,094 | A | * | 11/1998 | Ermel et al. | |
| 5,924,102 | A | * | 7/1999 | Perks | 707/200 |
| 6,018,745 | A | * | 1/2000 | Kuftedjian | 707/200 |
| 6,101,506 | A | * | 8/2000 | Ukai et al. | 707/200 |
| 6,223,206 | B1 | * | 4/2001 | Dan et al. | 709/105 |
| 6,457,007 | B1 | * | 9/2002 | Kikuchi et al. | 707/100 |

* cited by examiner

*Primary Examiner*—Shahid Alam
*Assistant Examiner*—Isaac M. Woo
(74) *Attorney, Agent, or Firm*—Gail H. Zarick, Esq.; McGinn & Gibb, PLLC

(57) ABSTRACT

A file manager (and method) provided for locating a file identified by a path referring to a logical unit and an identifier, includes a table associating the file with a priority list of physical units. The file manager can be incorporated into the controller of peripheral devices in a computer system or an operating system of the computer system.

35 Claims, 2 Drawing Sheets

| IDENTIFICATION | ATTRIBUTE | PRIORITY LIST |
|---|---|---|
| C: | | 3Z |
| \DIR1 | | 3Z |
| \FILE1 | X | 3X, 2Y, 1Z |
| \FILE2 | R | 3Z, 2Y |
| | W | 2Y, 3Z |
| \FILE3 | H | |
| \FILE4 | R | 4X |
| \FILE5 | H | |
| \DIR2 | | 3Z |
| D: | | 1X |

| IDENTIFICATION | ATTRIBUTE | PRIORITY LIST |
|---|---|---|
| C: | | 3Z |
| \DIR1 | | 3Z |
| \FILE1 | X | 3X, 2Y, 1Z |
| \FILE2 | R | 3Z, 2Y |
| | W | 2Y, 3Z |
| \FILE3 | H | |
| \FILE4 | R | 4X |
| \FILE5 | H | |
| \DIR2 | | 3Z |
| D: | | 1X |

Figure 1

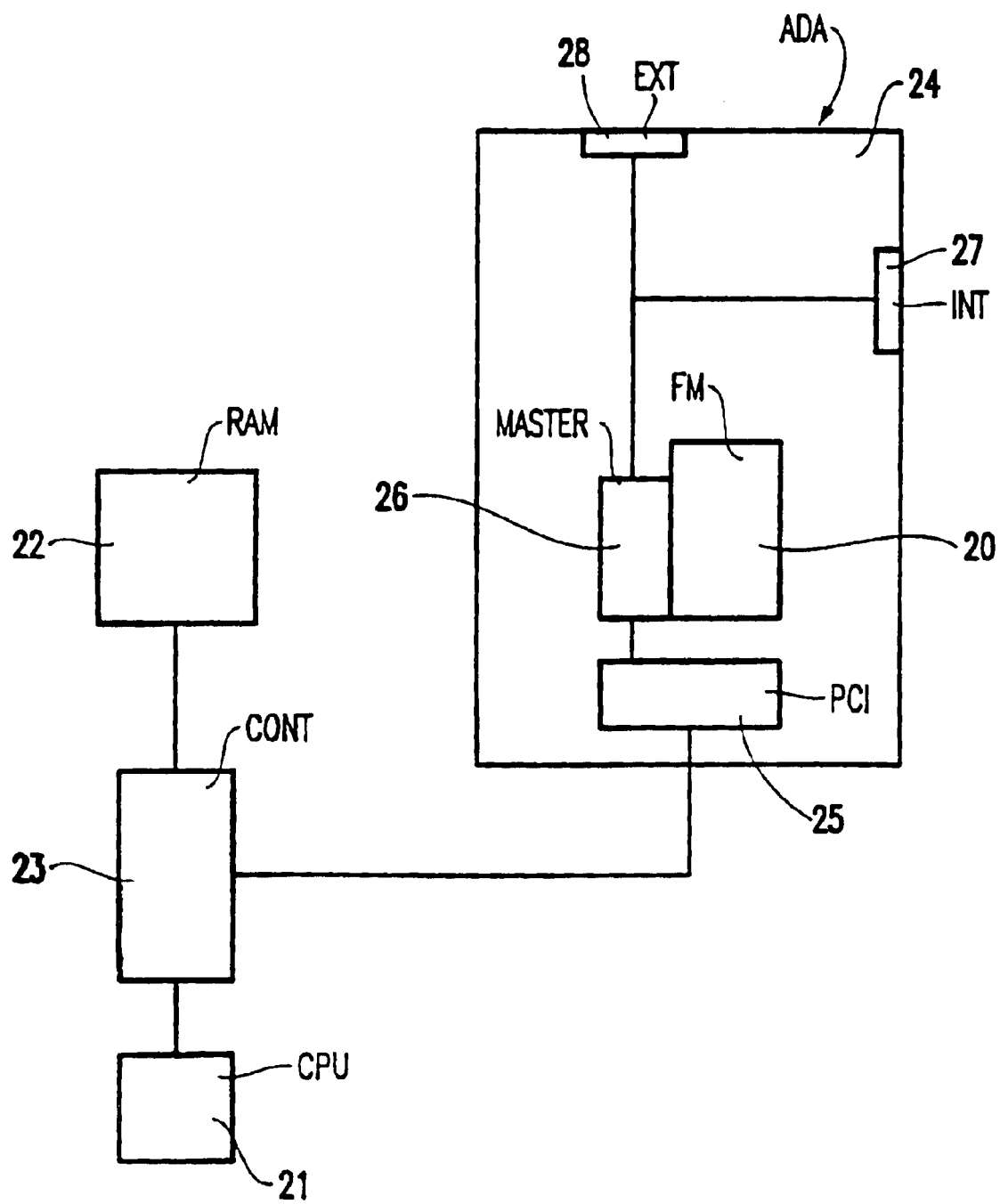

FILE MANAGER FOR STORING SEVERAL VERSIONS OF A FILE

BACKGROUND OF THE INVENTION

1. Field of the Invention

The present invention generally relates to computer systems and more particularly to a file manager for managing a plurality of files when it is required to store several versions for said files.

2. Description of the Related Art

In a computer system, a file manager shows where a file, which is commonly identified by a path, is physically located. Such a path is composed of a logical unit, a directory and a file name. The logical unit is generally referenced by a capital letter followed by a colon (e.g., C:). A directory gathers several files that have common characteristics. A classification is thus defined for the plurality of files linked to a same logical unit. Furthermore, a directory can be subdivided into subdirectories, which can themselves be subdivided into sub-subdirectories and so on. The term "directory" will be used hereinafter with its generic meaning (e.g., referring to the whole hierarchy of the classification).

A file has a file name (e.g., FILE1). When FILE 1 belongs to the directory DIR1 linked to logical unit C:, it is identified by the path C:\DIR1\FILE1. The directory and the file name represent an identifier which means that the file FILE1 is identified by a logical unit C: and the identifier \DIR1\FILE1.

The file manager therefore indicates that the file C:\DIR1\FILE1 is on a definite physical unit 3X (e.g., a hard disk drive).

Now assume that the computer is provided with a standard software such as a word processing software. Naturally, all the files of this software are known by the file manager. Then, further assume that a new version of this standard software should be implemented in the computer. This new version comprises files that have the same name as files of the previous version. According to a first solution, the operating system of the computer will store such a file of the new version in the file of the previous version, since they have the same identification. However, a problem arises that when these two files are different, a malfunction could occur when operating a program or an application file that needs the previous version of the standard software.

According to a second solution, the operating system of the computer will change the ES identification of the new file in order not to delete the previous file. For example, the file SETUP of the previous version was identified as F:\INSTALL\SETUP and the corresponding file of the new version is now identified as F:\SETUP\SETUP. If a third version of the same standard software is installed, this could lead to another file identified for instance as F:\INSTALL\SETUP\SETUP. However, a problem arises that when these three files are identical, there is a useless duplication, increasing the memory required for storing the software. Further, it is not possible to delete one of these files since some programs or application files know only F:\INSTALL\SETUP, other ones know only F:\SETUP\SETUP and the most recent ones know only F:\INSTALL\SETUP\SETUP.

SUMMARY OF THE INVENTION

In view of the foregoing and other problems, disadvantages, and drawbacks of the conventional computer system file managers, an object of the present invention is to provide a structure and method for a file manager that stores in records all the files required by a computer and that avoids any duplication.

In accordance with the present invention, a file manager is provided for locating a file identified by a path referring to a logical unit and an identifier, the file manager comprising a table associating the file with a priority list of physical units. Thus, several versions of a file with a common logical identification can be saved. In order to have access to any one of these versions, the file manager comprises a unit for modifying the priority list.

Preferably, the table also defines attributes (Read, Write, Hide, Execute) for each item of the priority list. In this case, according to an advantageous feature, the table defines for the file a physical unit with a write attribute that differs from a physical unit with a read attribute. In addition, the file manager comprises a unit for modifying the attributes.

In a preferred embodiment, the file manager is incorporated into the controller of peripheral devices in a computer system. Alternatively, the file manager is incorporated into the operating system of a computer system.

The present disclosure relates to subject matter contained in European Patent Application No. 99480001.9, filed Jan. 29, 1999, which is expressly incorporated herein by reference in its entirety.

BRIEF DESCRIPTION OF THE DRAWINGS

The foregoing and other objects, aspects and advantages will be better understood from the following detailed description of a preferred embodiment of the invention with reference to the drawings, in which:

FIG. 1 illustrates a table of a file manager according to the present invention; and FIG. 2 illustrates a location of a file manager according to a preferred embodiment of the invention.

DETAILED DESCRIPTION OF PREFERRED EMBODIMENTS OF THE INVENTION

The invention applies to a single personal computer or to a workstation, as well as to a server of a network connecting several computers.

Files stored in a computer or a server are often provided with attributes generally referred to as follows: R for read, which means that this file can be read, W for write, which means that this file can be written or modified, H for hide, when the involved file should not be accessed, X for execute, when the involved file is a program that can be executed.

Now, consider the file C:\DIR1\FILE1 of a standard software. A first version 1 of this file is stored on physical unit 1Z located in a server. Later, an updated version of the standard software is commercialized and a second version 2 of file C:\DIR1\FILE1 is consequently stored by a first network user on physical unit 2Y (e.g., a hard disk drive of the user's personal computer connected to the server).

Still later, the updated software is put at the disposal of every network user and consequently, a third version 3 of file C:\DIR1\FILE1 is stored on physical unit 3X in the server.

With reference to FIG. 1, the file manager of the first user includes a table which shows that this file has an X attribute and is associated with a priority list of physical units 3X, 2Y, 1Z respectively corresponding to versions 3, 2 and 1 of this file.

When the first user starts an execution of file FILE1, the file manager will first select the corresponding file in physical unit 3X. If this file is not available, the file manager will then look for the version stored in physical unit 2Y and if this version is not available either, it will select the first version stored in physical unit 1Z.

Between the installation of versions 2 and 3 of FILE1, the priority list is naturally limited to 2Y, 1Z. An execution of FILE1 is therefore operated with version 2. If a malfunction appears with a program or an application file created prior to the installation of version 2, it is necessary to return to version 1 of FILE1. This operation is easily done by modifying the priority list so it becomes 1Z, 2Y.

After the installation of version 3 of FILE1, the priority list is thus 3X, 2Y, 1Z. Advantageously, if a problem occurs with the third version 3 of FILE1, it is possible to return to version 2 of this file with a modification of the priority list. Furthermore, when it is certain that versions 2 and 3 are equivalent, it is possible to remove version 2 from the priority list which becomes 3X, 1Z. It is even possible to delete version 2 in physical unit 2Y, which frees memory in this unit.

The equivalence between versions 2 and 3 can be established by different means. A first way is to check that the sizes and parities of both versions are equal. A second way (e.g., more empirical) is in determining that if no problem has occurred with version 3 during a definite lapse of time, then version 3 is satisfactory.

The invention also allows an advantageous application in the management of software that is shared by a plurality of users. Conventionally, such software, located in a server, includes common files and customization files. A common file is common for all users, which means that such a file is stored only once. A customization file is specific to an identified user which means that such a file is stored a plurality of times corresponding to the number of users under a corresponding plurality of identifications.

Naturally, some of the common files need customization files to run. Apparently, the software should comprise selection means to designate which customization file should be used by such a common file. However, the present invention allows the deletion of these selection means since a customization file can be designated by a generic identification (e.g., C:\DIR1\FILE4). The selection is then made by the file manager.

As an example, the file manager associates this customization file respectively with physical unit 4X for user A, 4Y for user B, 4Z for user C and so on. It should be further noted that the customization file could be associated with the same physical unit provided that this unit designates a drive belonging to a personal computer and not to the server.

The present invention allows another advantageous application by giving different attributes to files identified by the same path but associated with different physical units. For example, the file identified C:\DIR1\FILE2 with a read attribute has a priority list 3Z, 2Y and this same file with a write attribute has a priority list 2Y, 3Z.

Accordingly, this file is read in physical unit 3Z and when it is modified, it is stored in physical unit 2Y. It follows that two versions of the same file are available, the old one on 3Z and the new one with the modifications on 2Y.

Usually, the new version, which is saved on 2Y, is the version required for further use. It is then necessary to reverse the priority list for the read attribute which then becomes 2Y, 3Z in order to be able to read the new version. Consequently, the priority list for the write attribute should also be reversed.

Nevertheless, when reading the new version, it could appear that this version is erroneous because the modifications of the old version should not have been made. It is therefore necessary to restore the old version. This is done by reversing again both priority lists which recover their initial states, 3Z, 2Y for the read attribute and 2Y, 3Z for the write attribute. Considering only the first item of each priority list, it appears that the physical unit with a write attribute differs from the physical unit with a read attribute.

With reference to FIG. 2, there is shown a file manager 20 according to a preferred embodiment. The file manager 20 preferably is implemented in equipment such as a personal computer, a workstation or a server.

The equipment preferably includes a central processor unit (CPU) 21 and a random-access memory (RAM) 22, each one connected to a first controller 23. First controller 21 is provided for controlling the bus and the memory 22 is further connected to an adapter 24 by a bus generally referred to as PCI (Peripheral Component Interconnect) bus 25.

The adapter 24 is preferably a Small Computer System Interface (SCSI) adapter, which is an ANSI standard. This standard defines a bus and the logical interfaces associated to this bus for interconnecting computers and peripheral devices. This adapter 24 is therefore provided with a PCI interface connected to the PCI bus 25 and to a second controller 26 in charge of controlling the peripheral devices. The second controller 26 is also connected by a SCSI bus to an internal interface 27 and to an external interface 28. The disk drives of the computer are connected to the internal interface while the external interface is used for external connection, to a network for instance.

According to this preferred embodiment, the file manager 20 is incorporated to the second controller 26. Alternatively, the file manager 20 can be implemented as a function of the operating system of the computer. Thus, the table, which contains the location and attributes of each file, is stored in the hard disk drive. This table may be duplicated in the memory 22 for performance improvement.

The scope of the present invention is in no way limited to the above embodiments. In particular, any means could be replaced by equivalent means.

While the invention has been described in terms of preferred embodiments, those skilled in the art will recognize that the invention can be practiced with modification within the spirit and scope of the appended claims.

What is claimed is:

1. A file manager provided for locating a file identified by a path referring to a unit and an identifier, comprising:
    a table for associating said file with a priority list of physical units,
    wherein said physical units store a plurality of versions of said file,
    wherein said table comprises a plurality of associations of a same file logical path name and a file name in a one-to-one correspondence with a plurality of physical units,
    wherein each of said plurality of associations comprises an association of a unique version of said file having said same file logical path name and said file name such that each of said stored plurality of versions of said file are not duplicated, and
    wherein said priority list of physical units is prioritized according to said plurality of versions of said file based on at least one of a least amount of malfunctions in said versions, a least bugged version of said versions, an availability of said versions, a date of said versions, and a least protection of said version against at least one of an unprotected read, an execute, and a write operation.

2. A file manager according to claim 1, further comprising a unit for modifying said priority list.

3. A file manager according to claim 2, wherein said table also defines attributes for each item of said priority list.

4. A file manager according to claim 3, further comprising a unit for modifying said attributes.

5. A file manager according to claim 1, wherein said table also defines attributes for each item of said priority list.

6. A file manager according to claim 5, wherein said table defines for said file a physical unit with a write attribute that differs from a physical unit with a read attribute.

7. A file manager according to claim 3, further comprising a unit for modifying said attributes.

8. A controller of peripheral devices in a computer system, comprising a file manager according to claim 1.

9. An operating system of a computer system, comprising a file manager according to claim 1.

10. A medium comprising computer readable instructions for carrying out a file manager according to claim 1.

11. The file manager, as claimed in claim 1, wherein when a second request for a file logical path name and a file name is the same as a first request, said file manager associates a physical unit listed on said priority list to said file name of said second request different from a physical unit associated with a file name of said first request.

12. The file manager, as claimed in claim 1, wherein said file manager selectively accesses a first association of a same file logical path name and a file name established prior to a second association of a same file logical path name and a file name.

13. The file manager, as claimed in claim 1, wherein said file manager routes a subsequent request to access a same file logical path name and a same file name as a previous request to a different version of said file logical path name and said file name on a different physical unit.

14. The file manager, as claimed in claim 1, wherein said file manager establishes and maintains said priority list of physical units.

15. The file manager, as claimed in claim 1, wherein each of said physical units holds a different version of said file.

16. The file manager according to claim 1, wherein each of said unique versions of said file is associated with a different priority from said priority list.

17. The file manager of claim 1, wherein files identified by the same file logical path name and file name and associated with different physical units comprise different attributes.

18. The file manager, as claimed in claim 1, wherein said priority list includes names of said physical units.

19. The file manager, as claimed in claim 1, wherein said priority list includes only names of said physical units.

20. The file manager, as claimed in claim 1, wherein locating said file is performed in a single access of said table.

21. The file manager, as claimed in claim 1, wherein at least one of adding a new file name to the priority list and modifying said file name is performed in a single access of said table.

22. A file manager for locating a file, comprising:
a table for associating said file with a priority list of physical units,
wherein said file is identified by a path referring to a logical unit and an identifier,
wherein said physical units store a plurality of versions of said file,
wherein said table comprises a plurality of associations of a same file logical path name and a file name in a one-to-one correspondence with a plurality of physical units,
wherein each of said plurality of associations comprises an association of a unique version of said file having said same file logical path name and said file name such that each of said stored plurality of versions of said file are not duplicated, and
wherein said priority list of physical units is prioritized according to said plurality of versions of said file based on at least one of a least amount of malfunctions in said versions, a least bugged version of said versions, an availability of said versions, a date of said versions, and a least protection of said version against at least one of an unprotected read, an execute, and a write operation.

23. The file manager of claim 22, wherein a plurality of versions of said file with a common logical identification are savable.

24. The file manager of claim 23, further comprising a modifying unit for modifying the priority list, thereby to access any of said plurality of versions.

25. A method for locating a file identified by a path referring to a logical unit and an identifier, comprising:
associating, in a file manager having a table, said file with a priority list of physical units,
wherein said physical units store a plurality of versions of said file,
wherein said table comprises a plurality of associations of a same file logical path name and a file name in a one-to-one correspondence with a plurality of physical units,
wherein each of said plurality of associations comprises an association of a unique version of said file having said same file logical path name and said file name such that each of said stored plurality of versions of said file are not duplicated, and
wherein said priority list of physical units is prioritized according to said plurality of versions of said file based on at least one of a least amount of malfunctions in said versions, a least bugged version of said versions, an availability of said versions, a date of said versions, and a least protection of said version against at least one of an unprotected read, an execute, and a write operation.

26. The method of claim 25, further comprising:
selecting one of said plurality of versions of said file based on said priority list.

27. The method of claim 26, further comprising:
selecting another of said plurality of versions of said file based on said priority list when said one of said plurality of versions of said file is not available.

28. The method of claim 26, further comprising:
selecting another of said plurality of versions of said file based on said priority list when said one of said plurality of versions of said file malfunctions.

29. The method of claim 25, further comprising:
determining equivalence of one of said plurality of versions of said file to another of said plurality of versions of said file.

30. The method of claim 29, wherein said determining equivalence comprises comparing at least one of sizes and parities of said one of said plurality of versions of said file and another of said plurality of versions of said file.

31. The method of claim 29, wherein said determining equivalence comprises determining whether a problem has occurred with one of said plurality of versions of said file during a predetermined period of time.

32. The method of claim 29, further comprising:
removing a corresponding physical unit of said one of said plurality of versions of said file from said priority list of physical units when said one of said plurality of versions of said file is determined to be equivalent to another of said plurality of versions of said file.

33. The method of claim 32, further comprising:
removing said one of said plurality of versions of said file from said corresponding physical unit.

34. A file manager for locating a file identified by a path referring to a logical unit and an identifier, comprising:
means for associating said file with a priority list of physical units,
wherein said physical units store a plurality of versions of said file,
wherein said means for associating comprises a plurality of associations of a same tile logical path name and a file name in a one-to-one correspondence with a plurality of physical units, and
wherein each of said plurality of associations comprises an association of a unique version of said file having said same file logical path name and said file name; and
means for selecting one of said plurality of versions of said file based on said priority list of physical units,
wherein said priority list of physical units is prioritized according to said plurality of versions of said file based on at least one of a least amount of malfunctions in said versions, a least bugged version of said versions, an availability of said versions, a date of said versions, and a least protection of said version against at least one of an unprotected read, an execute, and a write operation.

35. A file manager comprising:
a table comprising an association of at least one file with a priority list of a plurality of physical units corresponding to a plurality of versions of said at least one file, said at least one file being identified by a logical path and a name,
wherein a unique version of said at least one file is retrievable, based on said logical path and said name, from one of said plurality of physical units according to a priority order of said priority list, and
wherein said priority list of physical units is prioritized according to said plurality of versions of said file based on at least one of a least amount of malfunctions in said versions, a least bugged version of said versions, an availability of said versions, a date of said versions, and a least protection of said version against at least one of an unprotected read, an execute, and a write operation.

* * * * *